United States Patent
Jeon et al.

(10) Patent No.: US 10,832,447 B2
(45) Date of Patent: Nov. 10, 2020

(54) ARTIFICIAL INTELLIGENCE ENCODING AND ARTIFICIAL INTELLIGENCE DECODING METHODS AND APPARATUSES USING DEEP NEURAL NETWORK

(71) Applicant: SAMSUNG ELECTRONICS CO., LTD., Suwon-si (KR)

(72) Inventors: Sunyoung Jeon, Suwon-si (KR); Jaehwan Kim, Suwon-si (KR); Youngo Park, Suwon-si (KR); Jongseok Lee, Suwon-si (KR); Minseok Choi, Suwon-si (KR); Kwangpyo Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/844,124

(22) Filed: Apr. 9, 2020

(65) Prior Publication Data

US 2020/0234469 A1   Jul. 23, 2020

Related U.S. Application Data

(63) Continuation of application No. 16/785,092, filed on Feb. 7, 2020, which is a continuation of application No. PCT/KR2019/012836, filed on Oct. 1, 2019.

(30) Foreign Application Priority Data

Oct. 19, 2018 (KR) .................. 10-2018-0125406
Apr. 8, 2019 (KR) .................. 10-2019-0041109

(51) Int. Cl.
*G06T 9/00* (2006.01)
*H04N 19/86* (2014.01)
(Continued)

(52) U.S. Cl.
CPC ............... *G06T 9/002* (2013.01); *G06N 3/04* (2013.01); *G06N 3/08* (2013.01); *G06T 3/4046* (2013.01);
(Continued)

(58) Field of Classification Search
CPC .... H04N 19/86; H04N 19/172; H04N 19/136; H04N 19/85; H04N 19/132; G06N 3/04;
(Continued)

(56) References Cited

U.S. PATENT DOCUMENTS

| 5,703,965 A * | 12/1997 | Fu .......................... G06T 9/007 382/232 |
| 6,898,319 B1 * | 5/2005 | Hazra .................... H04N 19/86 358/426.12 |

(Continued)

FOREIGN PATENT DOCUMENTS

| JP | 2008-527810 A | 7/2008 |
| JP | 2012-191250 A | 10/2012 |

(Continued)

OTHER PUBLICATIONS

Afonso, Mariana, Fan Zhang, and David R. Bull. "Spatial resolution adaptation framework for video compression." Applications of Digital Image Processing XLI. vol. 10752. International Society for Optics and Photonics, 2018. (Year: 2018).*

(Continued)

*Primary Examiner* — Geoffrey E Summers
(74) *Attorney, Agent, or Firm* — Sughrue Mion, PLLC

(57) ABSTRACT

Provided is an artificial intelligence (AI) encoding apparatus including a memory storing one or more instructions, and a processor configured to execute the one or more instructions stored in the memory to obtain a first image by performing AI down-scaling on an original image through a deep neural network (DNN) for down-scaling, obtain artifact informa- (Continued)

tion indicating an artifact region in the first image, perform post-processing to change a pixel value of a pixel in the first image, based on the artifact information, and obtain image data corresponding to a result of encoding of the post-processed first image, and AI data including the artifact information.

6 Claims, 19 Drawing Sheets

(51) Int. Cl.
  *G06N 3/04* (2006.01)
  *G06N 3/08* (2006.01)
  *G06T 3/40* (2006.01)
  *G06T 5/00* (2006.01)
  *G06T 5/20* (2006.01)
  *G06T 5/50* (2006.01)

(52) U.S. Cl.
  CPC .............. *G06T 5/002* (2013.01); *G06T 5/20* (2013.01); *G06T 5/50* (2013.01); *H04N 19/86* (2014.11); *G06T 2207/20036* (2013.01); *G06T 2207/20084* (2013.01); *G06T 2207/20192* (2013.01)

(58) Field of Classification Search
  CPC ... G06N 3/08; G06N 3/02; G06N 3/06; G06T 9/002; G06T 3/4046; G06T 2207/20084; G06T 5/20; G06T 5/50; G06T 5/002; G06T 2208/20192; G06T 2207/20036; G06T 2207/20192
  USPC .................................................. 382/156–158
  See application file for complete search history.

(56) References Cited

U.S. PATENT DOCUMENTS

| | | | |
|---|---|---|---|
| 7,400,588 B2 | 7/2008 | Izzat et al. | |
| 8,184,164 B2 | 5/2012 | Yang et al. | |
| 9,251,572 B2 | 2/2016 | Shu et al. | |
| 9,679,213 B2 | 6/2017 | Yang et al. | |
| 10,148,723 B2 | 12/2018 | Falvo | |
| 10,218,971 B2 | 2/2019 | Dong et al. | |
| 2007/0189392 A1 | 8/2007 | Tourapis et al. | |
| 2010/0246689 A1* | 9/2010 | Filippini | H04N 19/154 375/240.27 |
| 2010/0309985 A1* | 12/2010 | Liu | H04N 19/86 375/240.25 |
| 2011/0228843 A1* | 9/2011 | Narroschke | H04N 19/61 375/240.03 |
| 2012/0230604 A1 | 9/2012 | Yamajo et al. | |
| 2014/0177706 A1 | 6/2014 | Fernandes et al. | |
| 2015/0256828 A1 | 9/2015 | Dong et al. | |
| 2017/0208345 A1 | 7/2017 | Jeong et al. | |
| 2017/0287109 A1 | 10/2017 | Tasfi | |
| 2017/0347061 A1 | 11/2017 | Wang et al. | |
| 2018/0107925 A1 | 4/2018 | Choi et al. | |
| 2018/0139458 A1 | 5/2018 | Wang et al. | |
| 2018/0176570 A1 | 6/2018 | Rippel et al. | |
| 2018/0249158 A1 | 8/2018 | Huang et al. | |
| 2018/0288440 A1 | 10/2018 | Chao | |
| 2018/0293706 A1 | 10/2018 | Viswanathan et al. | |
| 2018/0302456 A1 | 10/2018 | Katsavounidis et al. | |
| 2019/0013822 A1 | 1/2019 | Marpe et al. | |
| 2019/0075301 A1* | 3/2019 | Chou | H04N 19/132 |
| 2019/0230354 A1 | 7/2019 | Kim | |

FOREIGN PATENT DOCUMENTS

| | | |
|---|---|---|
| KR | 10-0224801 B1 | 10/1999 |
| KR | 10-2014-0145560 A | 12/2014 |
| KR | 10-2016-0036662 A | 4/2016 |
| KR | 10-2016-0080929 A | 7/2016 |
| KR | 10-2017-0059040 A | 5/2017 |
| KR | 10-2017-0100045 A | 9/2017 |
| KR | 10-2018-0001428 A | 1/2018 |
| KR | 10-2018-0043154 A | 4/2018 |
| KR | 10-2018-0052651 A | 5/2018 |
| KR | 10-1885855 B1 | 8/2018 |
| KR | 10-2018-0100976 A | 9/2018 |
| KR | 10-2018-0108288 A | 10/2018 |
| WO | 2017/036370 A1 | 3/2017 |
| WO | 2018/143992 A1 | 8/2018 |
| WO | WO-2019066704 A1 * | 4/2019 ............. H04N 19/14 |

OTHER PUBLICATIONS

Kim, Jaehwan, et al. "Dynamic frame resizing with convolutional neural network for efficient video compression." Applications of Digital Image Processing XL. vol. 10396. International Society for Optics and Photonics, 2017. (Year: 2017).*

Ki, Sehwan et al., "A Study on the Convolution Neural Network based on Blind High Dynamic Range Image Quality Assessment", Proceedings of Symposium of the Korean Institute of Communications and Information Sciences, 2018, pp. 1529-1530. (4 pages total).

Le Callet, Patrick et al., "A Convolution Neural Network Approach for Objective Video Quality Assessment", IEEE Transactions on Neural Networks, vol. 17, No. 5, Sep. 2006, pp. 1316-1327. (14 pages total).

Giannaopoulos, Michalis et al., "Convolutional Neural Networks for Video Quality Assessment", arXiv:1809.10117v1, [eess.IV], Sep. 26, 2018, pp. 1-12. (14 pages total).

PCT/ISA/210 & PCT/ISA/237 dated Aug. 6, 2019 by the International Searching Authority in counterpart International Patent Application No. PCT/KR2019/004171.

PCT/ISA/210 & PCT/ISA/237 dated Jan. 7, 2020 by the International Searching Authority in counterpart International Patent Application No. PCT/KR2019/012510.

PCT/ISA/210 & PCT/ISA/237 dated Jan. 22, 2020 by the International Searching Authority in counterpart International Patent Application No. PCT/KR2019/013344.

Communication (PCT/ISA/220, PCT/ISA/210 & PCT/ISA/237) dated Dec. 4, 2019 by the International Searching Authority in counterpart International Patent Application No. PCT/KR2019/010645.

Communication (PCT/ISA/220, PCT/ISA/210 & PCT/ISA/237) dated Jan. 23, 2020 by the International Searching Authority in counterpart International Patent Application No. PCT/KR2019/012836.

Communication (PCT/ISA/220, PCT/ISA/210 & PCT/ISA/237) dated Jan. 29, 2020 by the International Searching Authority in counterpart International Patent Application No. PCT/KR2019/013595.

Communication (PCT/ISA/220, PCT/ISA/210 & PCT/ISA/237) dated Jan. 30, 2020 by the International Searching Authority in counterpart International Patent Application No. PCT/KR2019/013421.

Communication (PCT/ISA/220, PCT/ISA/210 & PCT/ISA/237) dated Feb. 5, 2020 by the International Searching Authority in counterpart International Patent Application No. PCT/KR2019/013483.

Communication (PCT/ISA/220, PCT/ISA/210 & PCT/ISA/237) dated Feb. 21, 2020 by the International Searching Authority in counterpart International Patent Application No. PCT/KR2019/013733.

Jeong, Woojin et al., "Efficient Super-Resolution Method for Single Image based on Deep Neural Networks", Journal of the Institute of Electronics and Information Engineers, vol. 55, No. 6, pp. 779-786, Jun. 2018. (10 pages total).

Sergey Ioffe et al., "Batch Normalization: Accelerating Deep Network Training by Reducing Internal Covariate Shift", Proceedings of the 32nd International Conference on Machine Learning 2015, vol. 37, pp. 448-456, 2015. (11 pages total).

(56) References Cited

OTHER PUBLICATIONS

Seungbin Lee et al., "Performance Analysis of Convolution Neural Network and Generative Adversarial Network for Super Resolution", Journal of the Korean Institute of Information Scientists and Engineers, Jun. 2017, pp. 931-933. (6 pages total).

\* cited by examiner

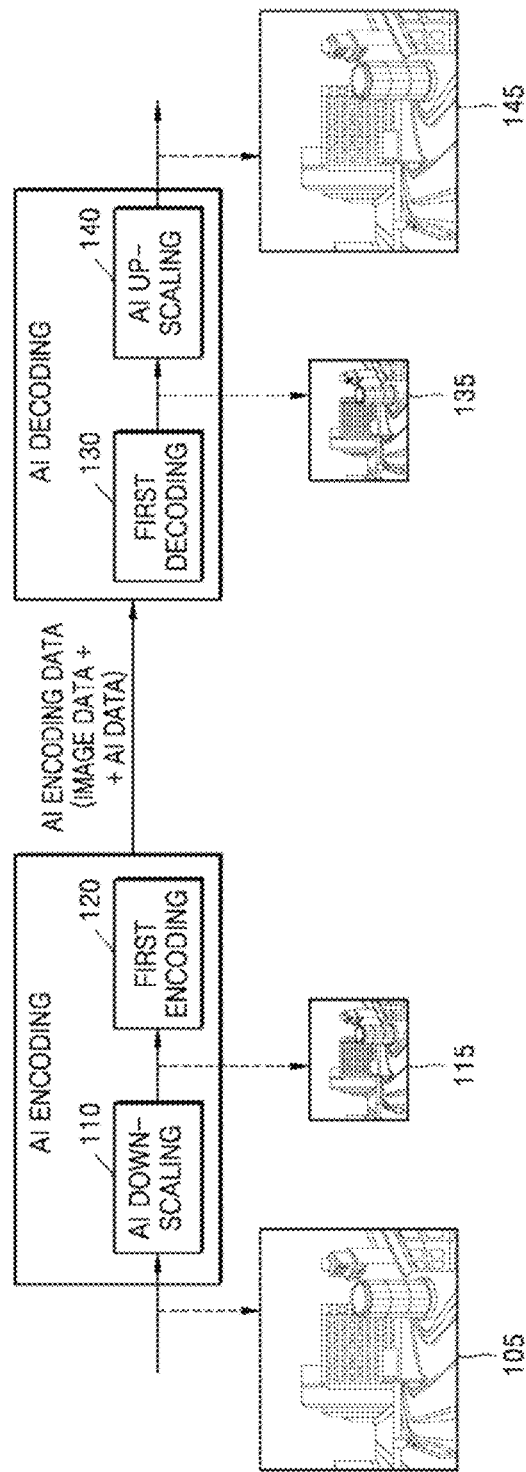
[Figure 1]

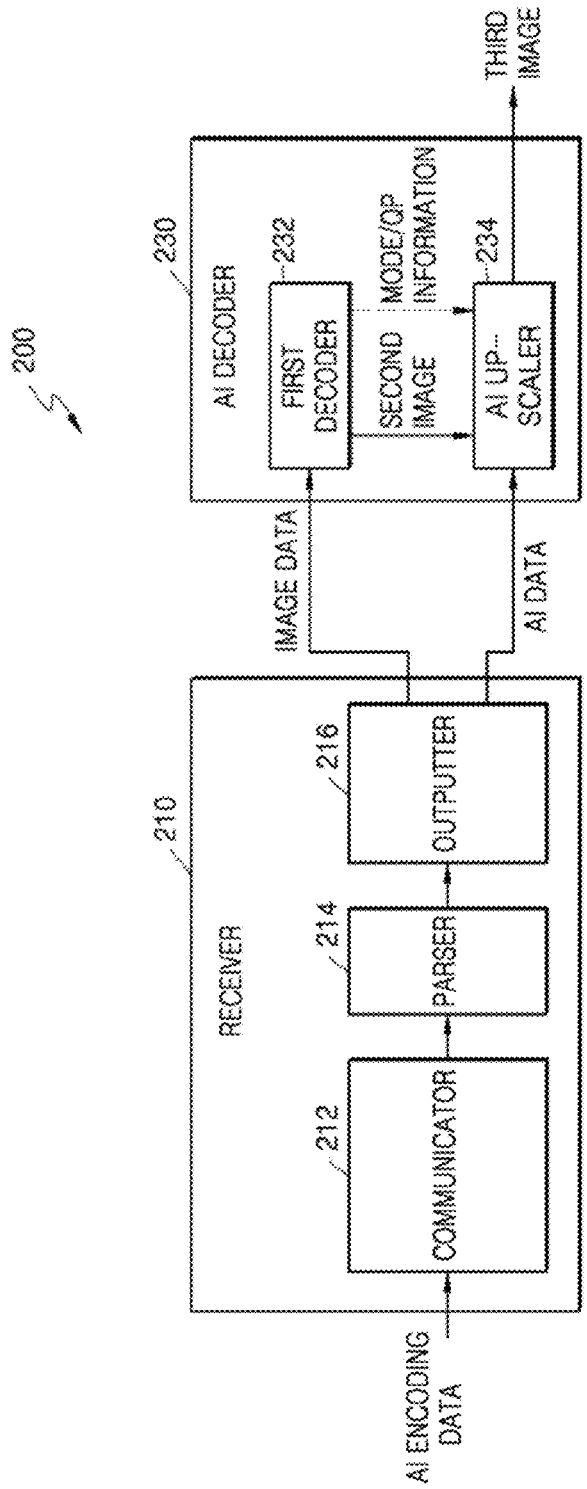
[Figure 2]

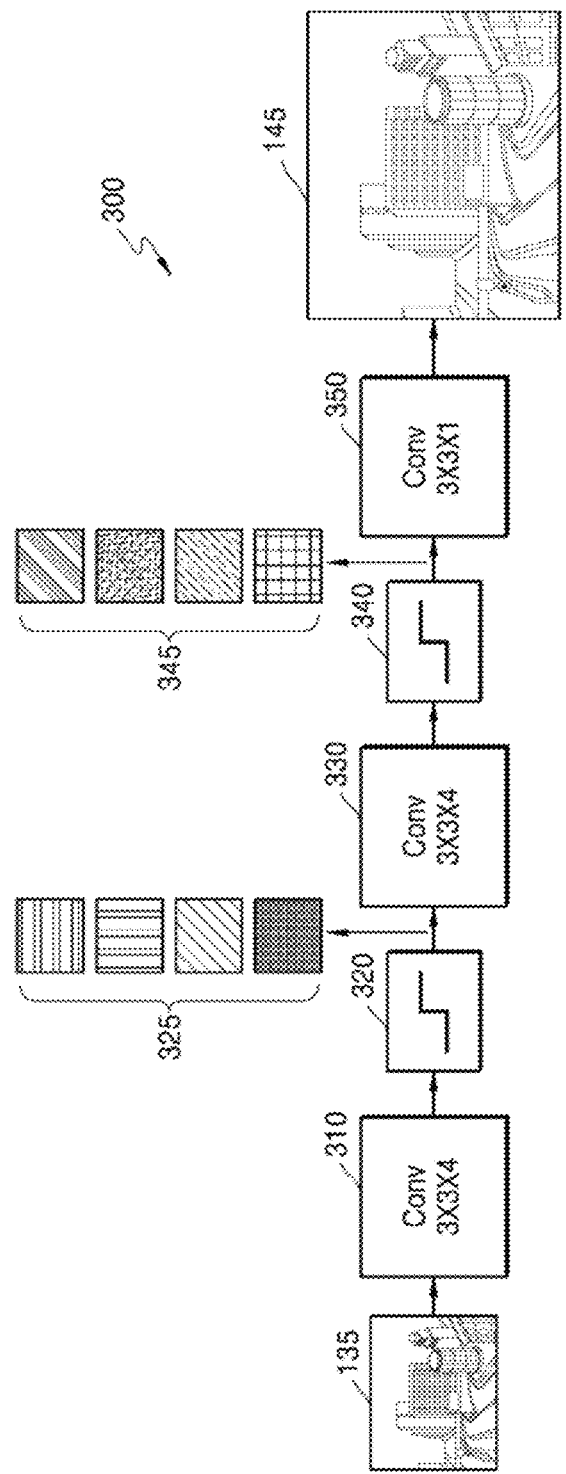
[Figure 3]

[Figure 4]
[Figure 5]
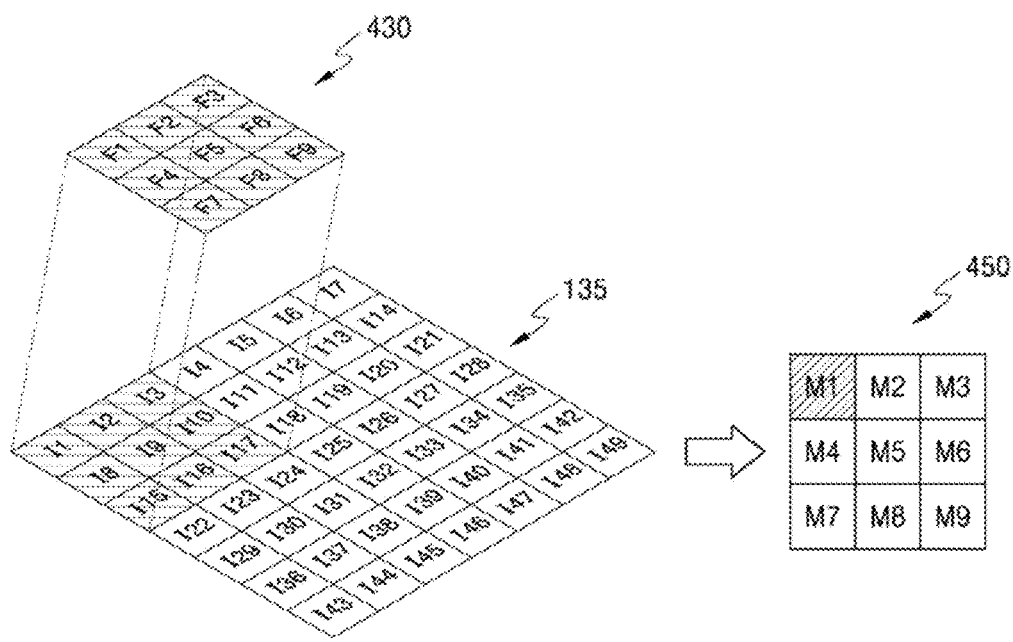
| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

[Figure 6]
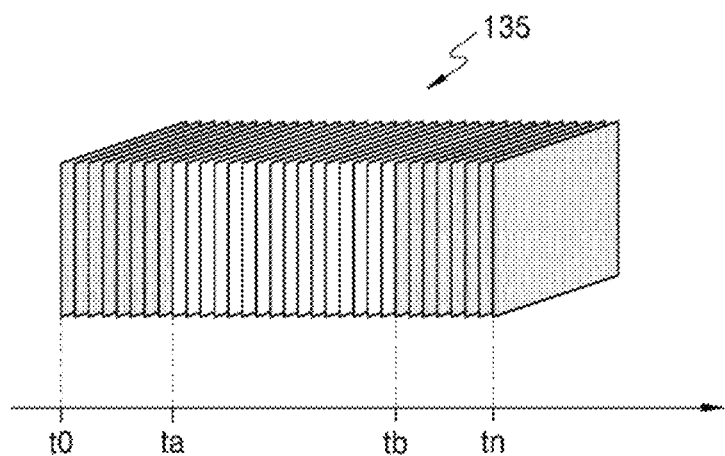

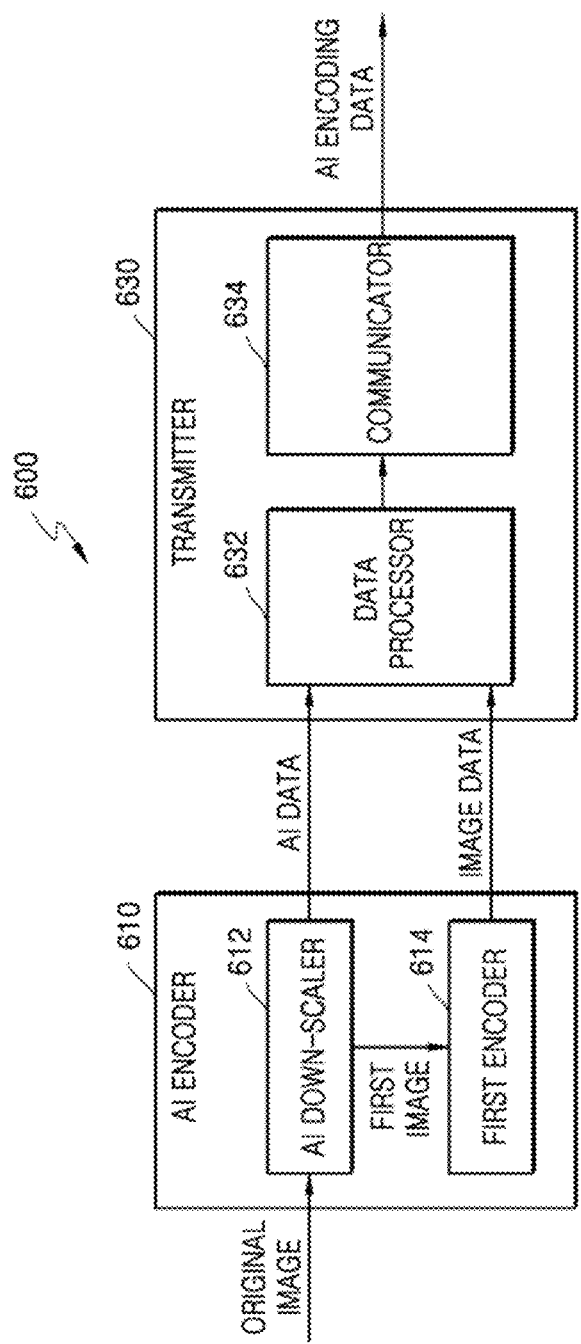
[Figure 7]

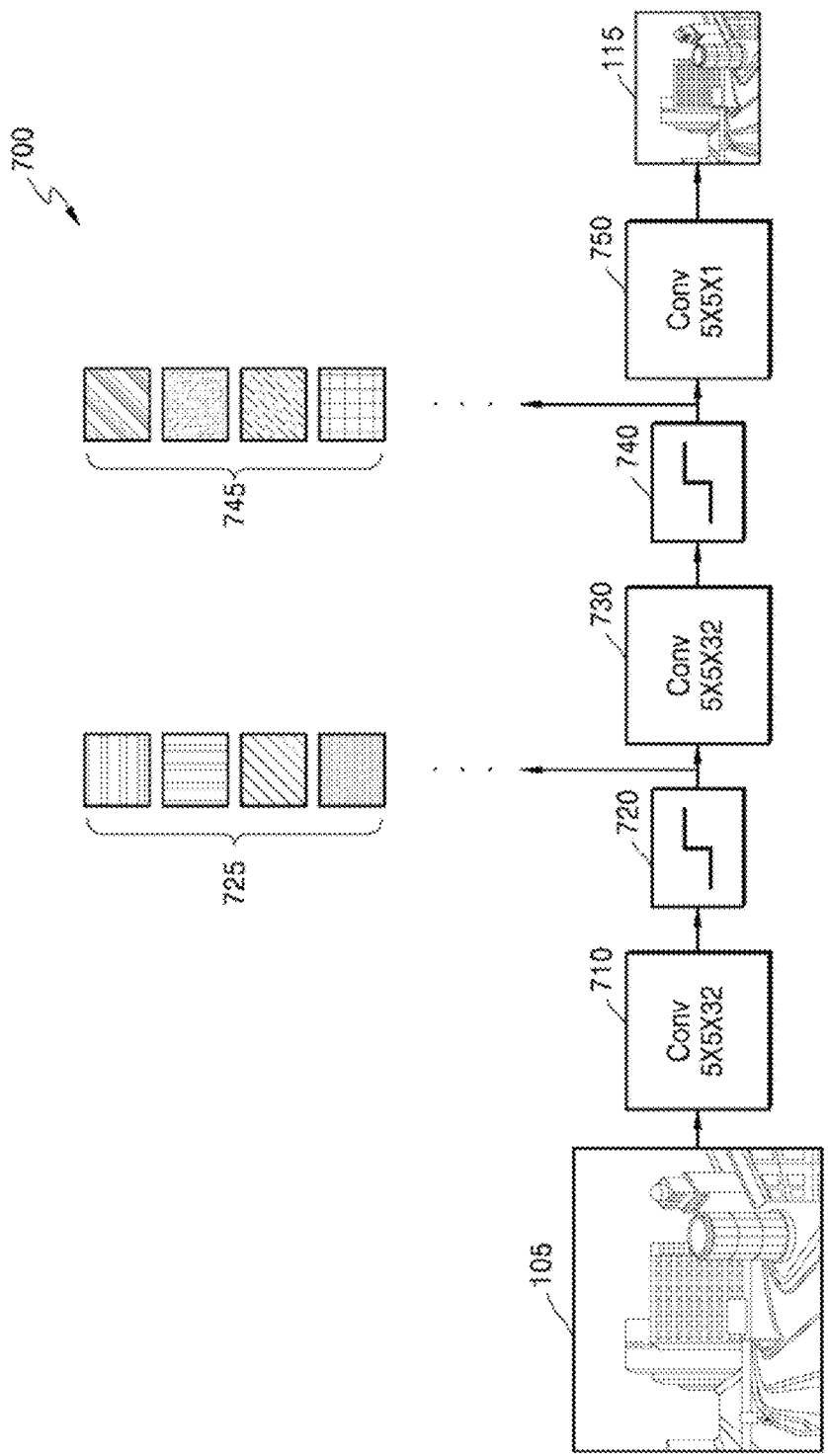
[Figure 8]

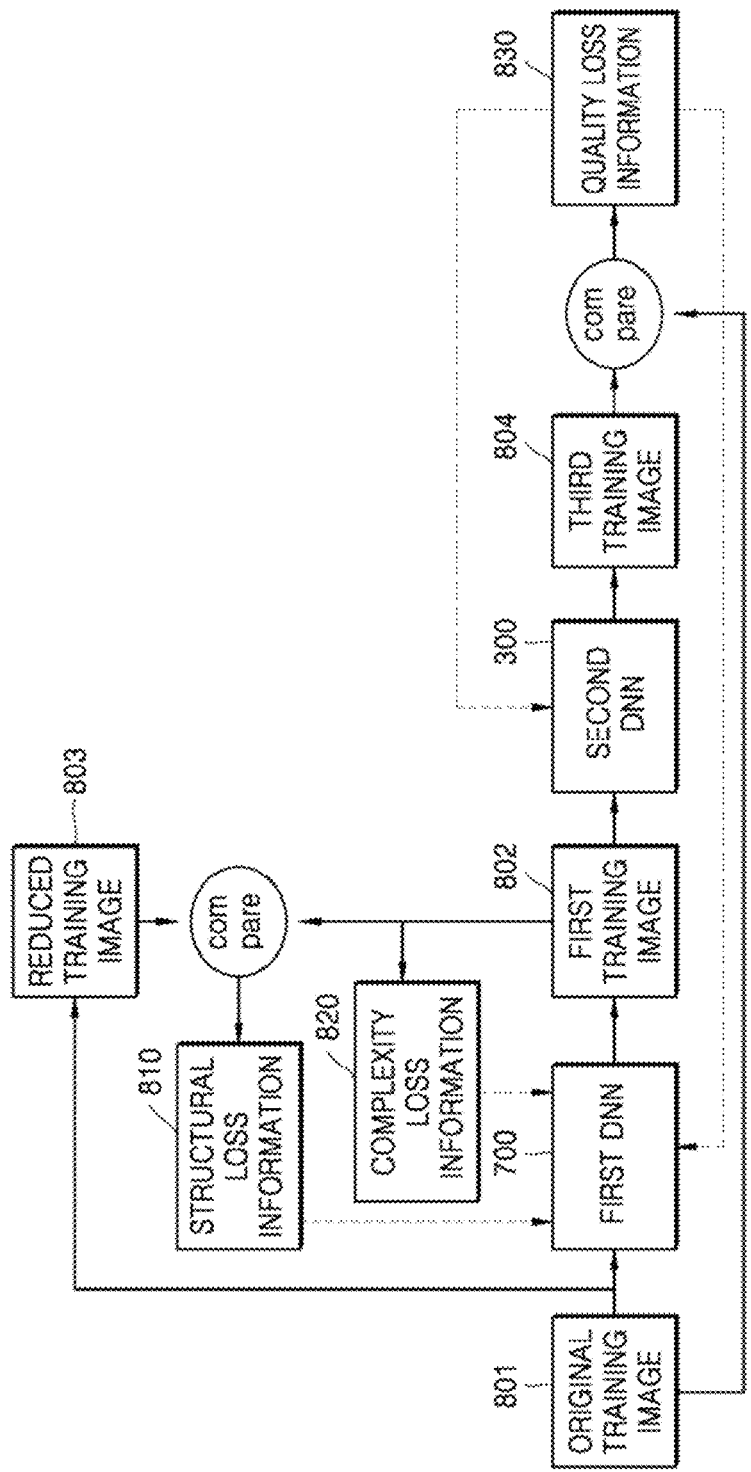
[Figure 9]

[Figure 10]
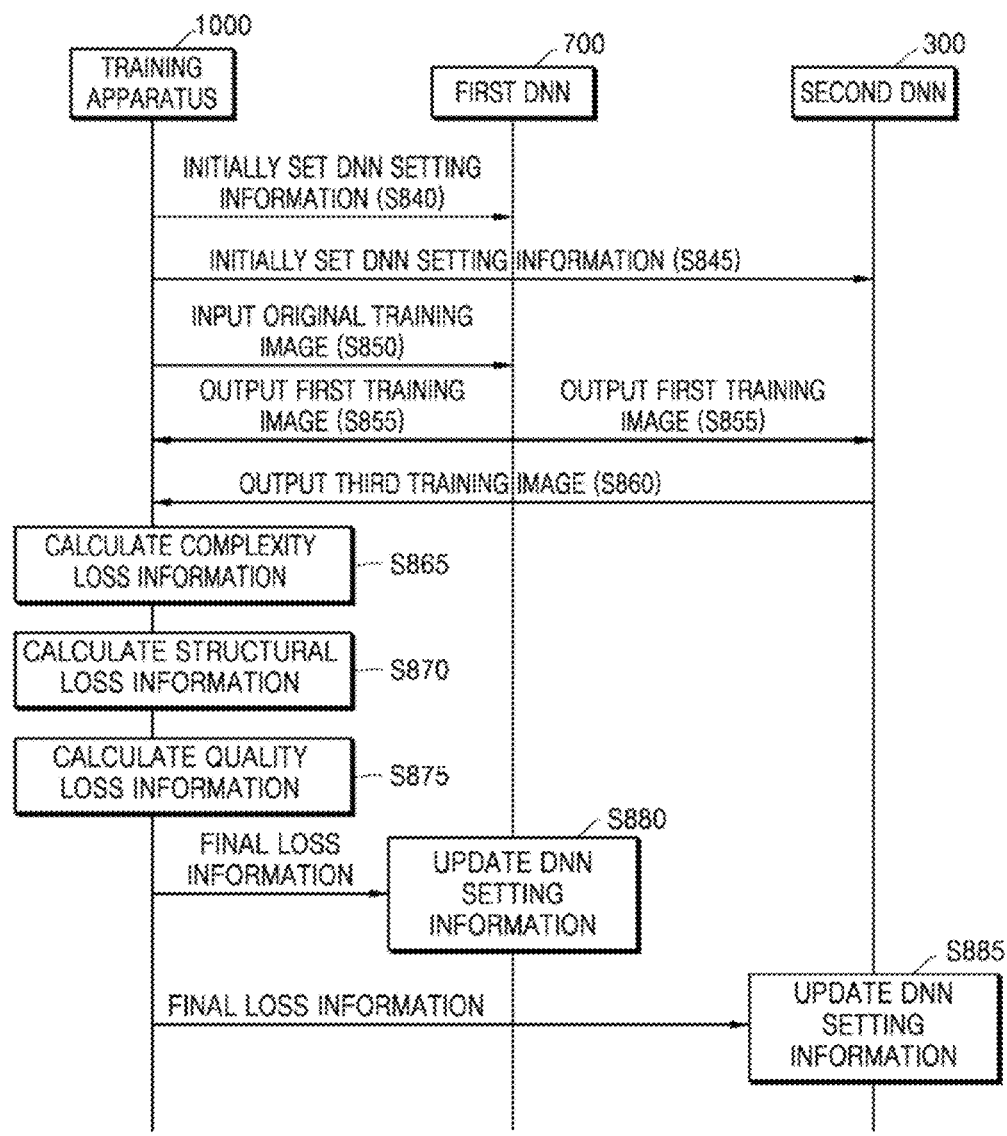

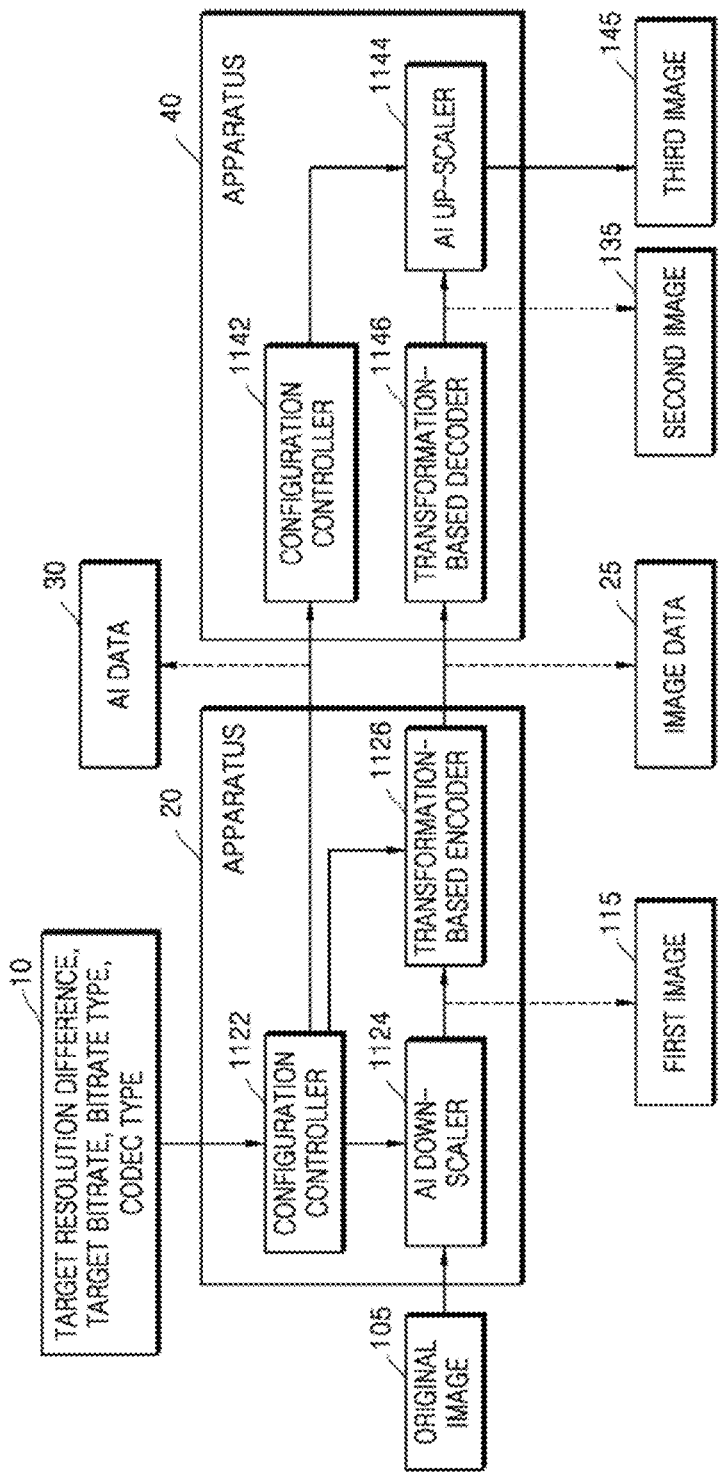
[Figure 11]

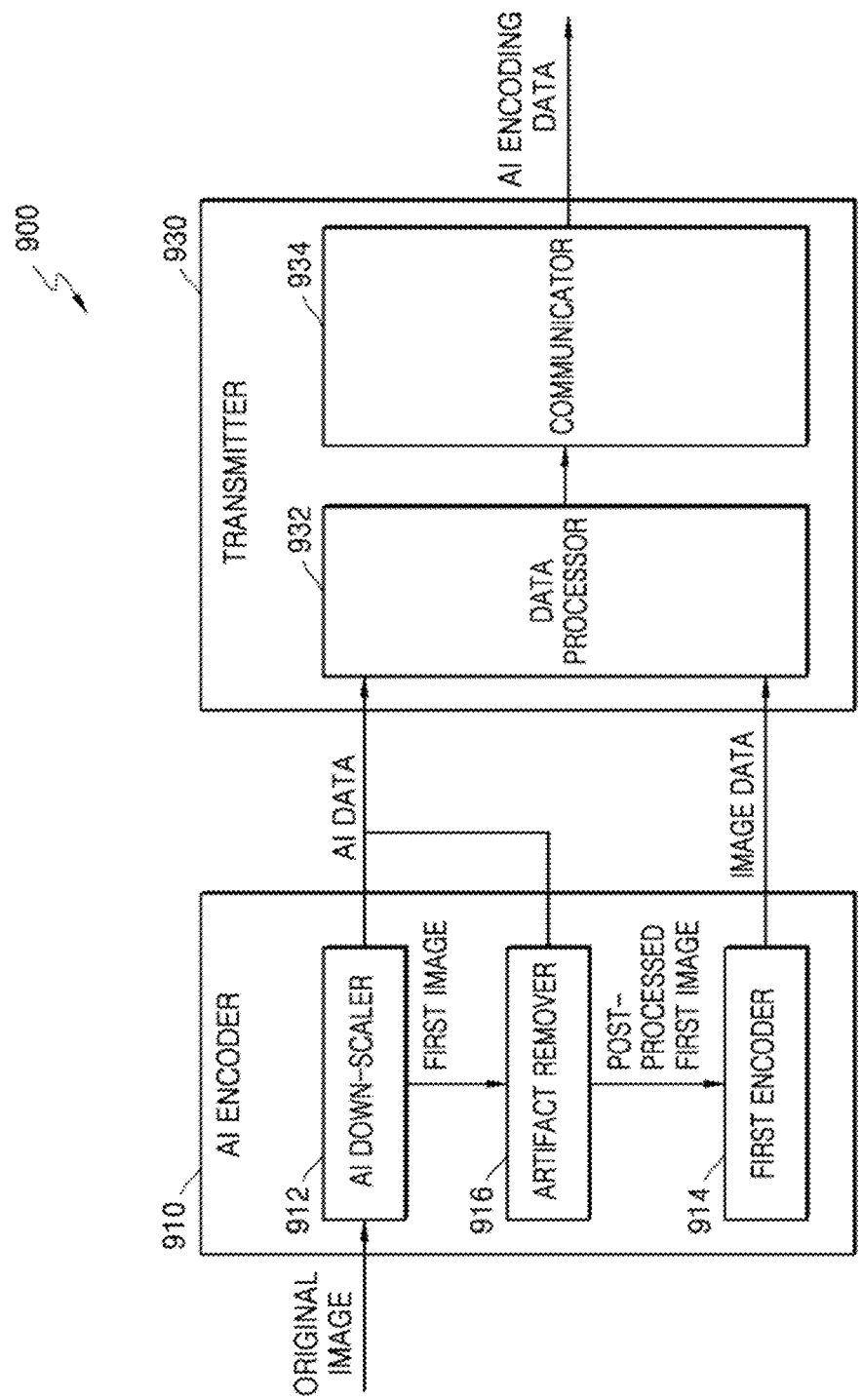
[Figure 12]

【Figure 13】
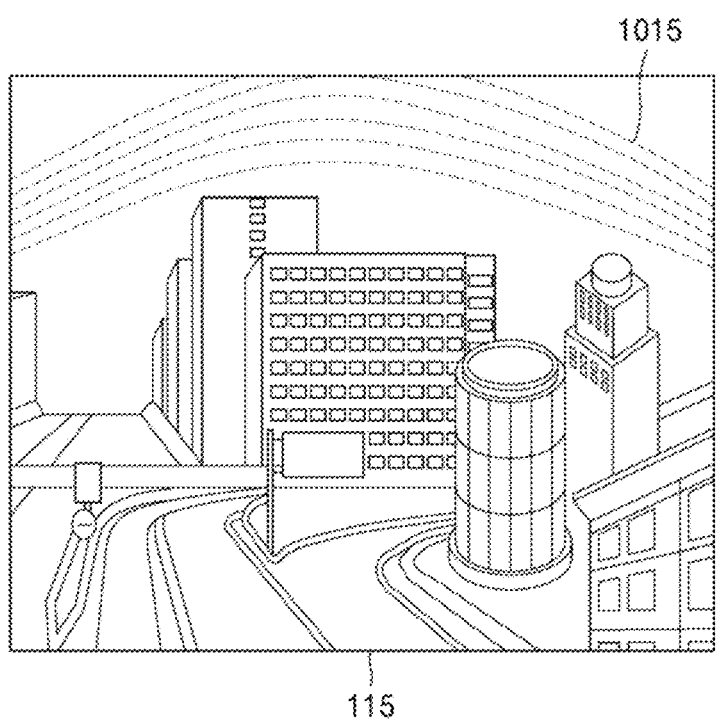

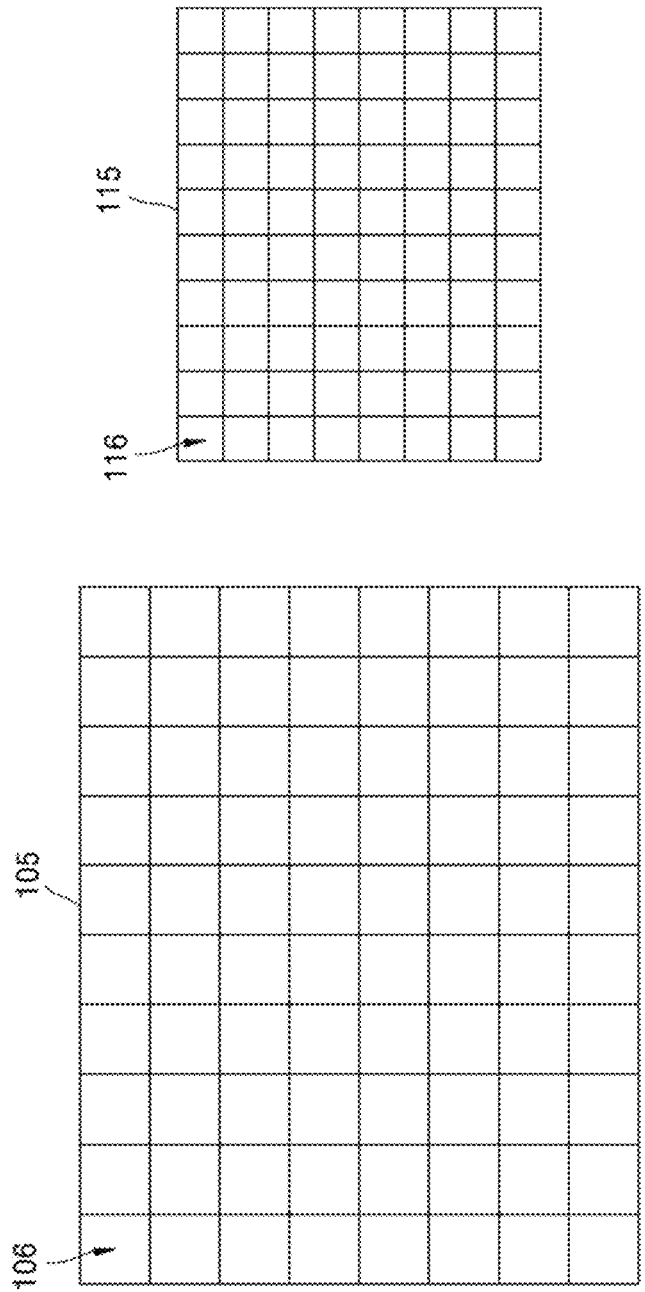
[Figure 14]

[Figure 15]
[Figure 16]

[Figure 17]
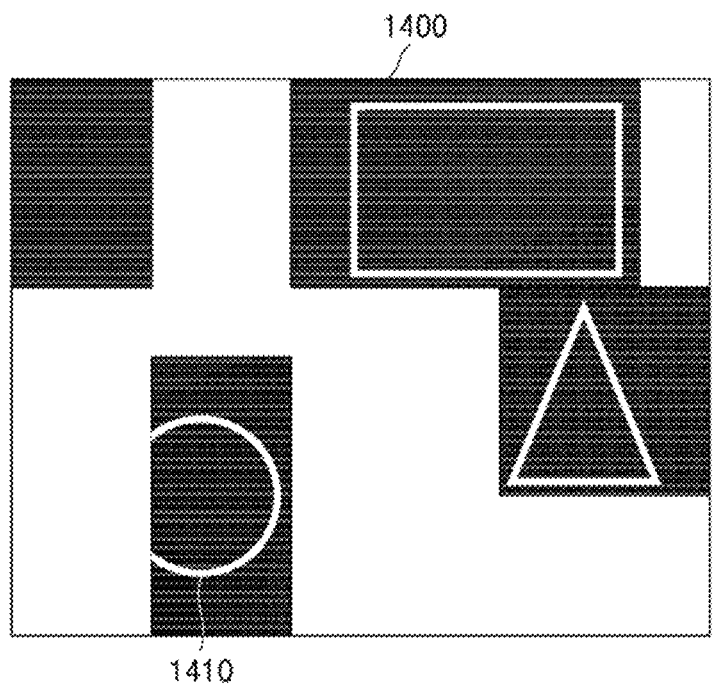
[Figure 18]
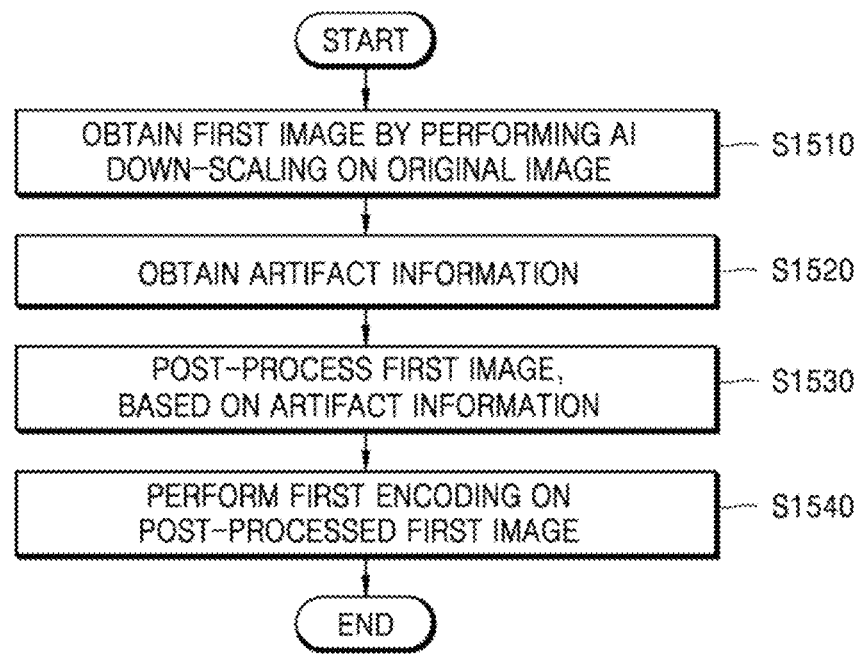

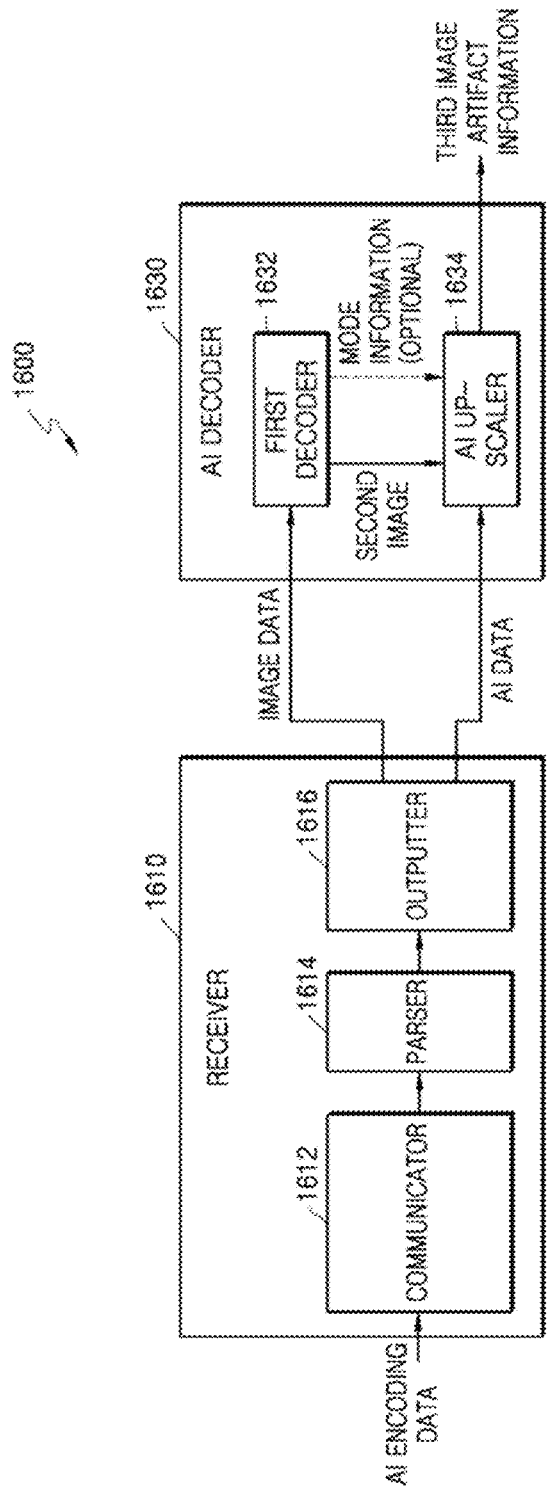
[Figure 19]

[Figure 20]
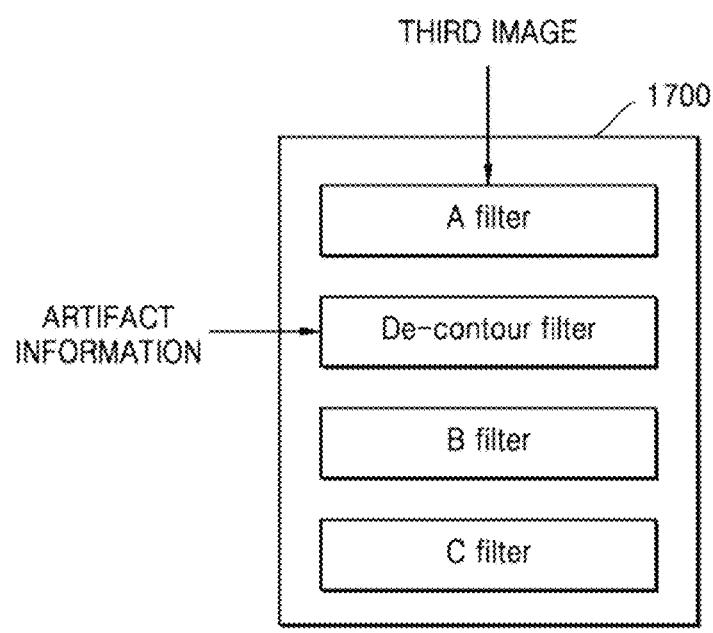

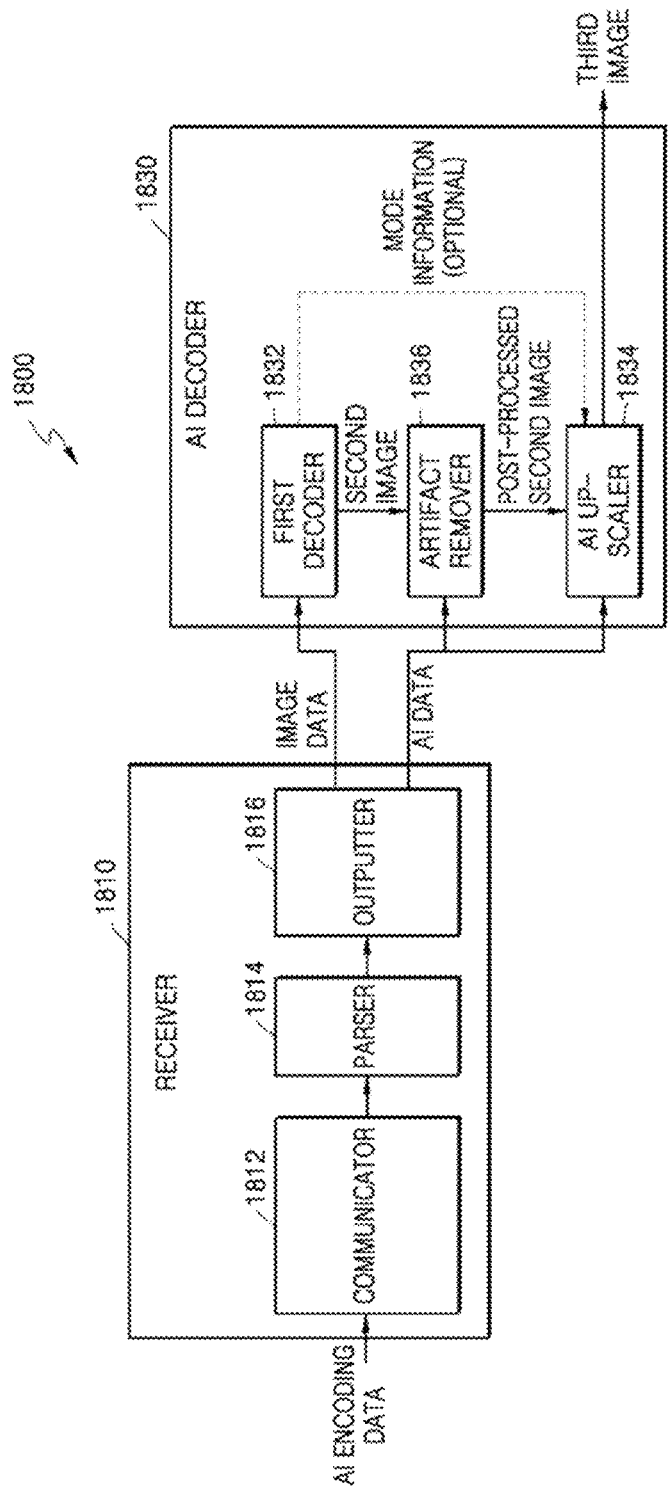
[Figure 21]

[Figure 22]
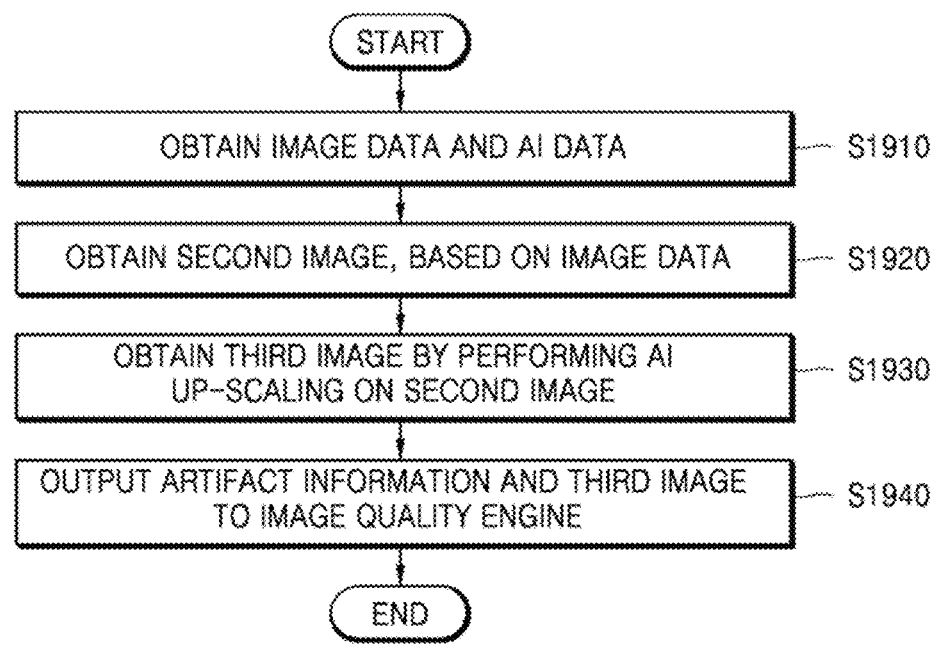

ARTIFICIAL INTELLIGENCE ENCODING AND ARTIFICIAL INTELLIGENCE DECODING METHODS AND APPARATUSES USING DEEP NEURAL NETWORK

CROSS-REFERENCE TO RELATED APPLICATIONS

This application is a continuation application of U.S. patent application Ser. No. 16/785,092, filed on Feb. 7, 2020, which is a continuation application of International Application No. PCT/KR2019/012836, filed Oct. 1, 2019, which claims priority from Korean Patent Application No. 10-2019-0041109, filed on Apr. 8, 2019, and from Korean Patent Application No. 10-2018-0125406, filed on Oct. 19, 2018, the disclosures of which are incorporated herein in their entirety by reference.

TECHNICAL FIELD

The disclosure relates to image processing. More particularly, the disclosure relates to artificial intelligence (AI) encoding and AI decoding apparatuses and methods using a deep neural network (DNN).

BACKGROUND ART

An image is encoded by a codec conforming to a certain data compression standard, e.g., the Moving Picture Experts Group (MPEG) standard, and then is stored in a recording medium or is transmitted through a communication channel in the form of a bitstream.

Due to the development and distribution of hardware capable of reproducing and storing a high-resolution/high-quality image, demand for a codec capable of effectively encoding and decoding a high-resolution/high-quality image is increasing.

DISCLOSURE

Technical Solution

According to an embodiment of the disclosure, an artificial intelligence (AI) encoding apparatus includes a memory storing one or more instructions, and a processor configured to execute the one or more instructions stored in the memory to obtain a first image by performing AI down-scaling on an original image through a deep neural network (DNN) for down-scaling, obtain artifact information indicating an artifact region in the first image, perform post-processing to change a pixel value of a pixel in the first image, based on the artifact information, and obtain image data corresponding to a result of encoding of the post-processed first image, and AI data including the artifact information.

Advantageous Effects

Provided are artificial intelligence (AI) encoding and AI decoding methods and apparatuses capable of AI-encoding and AI-decoding an image at a low bitrate by using a deep neural network (DNN).

Provided are AI encoding and AI decoding methods and apparatuses capable of improving the quality of an image by removing artifacts in the image.

Additional aspects will be set forth in part in the description which follows and, in part, will be apparent from the description, or may be learned by practice of the presented embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 1 is a diagram for describing an artificial intelligence (AI) encoding process and an AI decoding process, according to an embodiment;

FIG. 2 is a block diagram of a configuration of an AI decoding apparatus according to an embodiment;

FIG. 3 is a diagram showing a second deep neural network (DNN) for performing AI up-scaling on a second image;

FIG. 4 is a diagram for describing a convolution operation by a convolution layer;

FIG. 5 is a table showing a mapping relationship between several pieces of image-related information and several pieces of DNN setting information;

FIG. 6 is a diagram showing a second image including a plurality of frames;

FIG. 7 is a block diagram of a configuration of an AI encoding apparatus according to an embodiment;

FIG. 8 is a diagram showing a first DNN for performing AI down-scaling on an original image;

FIG. 9 is a diagram for describing a method of training a first DNN and a second DNN;

FIG. 10 is a diagram for describing a training process of a first DNN and a second DNN by a training apparatus;

FIG. 11 is a diagram of an apparatus for performing AI down-scaling on an original image and an apparatus for performing AI up-scaling on a second image;

FIG. 12 is a block diagram of an AI encoding apparatus according to another embodiment of the disclosure;

FIG. 13 is an image showing artifacts having occurred in the first image obtained through AI down-scaling on the original image;

FIG. 14 is a diagram showing the original image and the first image that are divided into block units;

FIG. 15 is a diagram showing an artifact map according to an embodiment of the disclosure;

FIG. 16 is a diagram showing an artifact map according to another embodiment of the disclosure;

FIG. 17 is a diagram showing an artifact map according to another embodiment of the disclosure;

FIG. 18 is a flowchart of an AI encoding method according to another embodiment of the disclosure;

FIG. 19 is a block diagram of an AI decoding apparatus according to another embodiment of the disclosure;

FIG. 20 is a block diagram of an image quality engine;

FIG. 21 is a block diagram of an AI decoding apparatus according to another embodiment of the disclosure; and FIG. 22 is a flowchart of an AI decoding method according to another embodiment of the disclosure.

BEST MODE

According to an embodiment of the disclosure, an artificial intelligence (AI) encoding apparatus includes a memory storing one or more instructions, and a processor configured to execute the one or more instructions stored in the memory to obtain a first image by performing AI down-scaling on an original image through a deep neural network (DNN) for down-scaling, obtain artifact information indicating an artifact region in the first image, perform post-processing to change a pixel value of a pixel in the first image, based on the artifact information, and obtain image data corresponding to a result of encoding of the post-processed first image, and AI data including the artifact information.

The artifact information may include an artifact map having a certain size.

The processor may be further configured to execute the one or more instructions to determine whether a pixel variance per block unit of the original image and a pixel variance per block unit of the first image satisfy a certain criterion, and obtain the artifact map having a predetermined pixel value per block unit, based on a result of the determination.

Among pixels included in the artifact map, pixels in a block unit satisfying the certain criterion may have a first pixel value and pixels in a block unit not satisfying the certain criterion may have a second pixel value.

The processor may be further configured to execute the one or more instructions to determine an edge region in the first image, and change the first pixel value of a region in the artifact map corresponding to the determined edge region, to the second pixel value.

The processor may be further configured to execute the one or more instructions to morphology-process the artifact map.

The certain criterion may be based on a result of comparing a ratio between the pixel variance per block unit of the original image and the pixel variance per block unit of the first image, to a certain value.

The performing of the post-processing may include applying random noise to an artifact region in the first image, based on the artifact information.

The performing of the post-processing may include filtering the first image to which the random noise is applied.

The processor may be further configured to execute the one or more instructions to determine a range of a random noise value, and the performing of the post-processing may include applying random noise included in the determined range of the random noise value, to the artifact region in the first image.

The processor may be further configured to execute the one or more instructions to input the first image to an artifact detection network, and obtain the artifact information output from the artifact detection network.

According to another embodiment of the disclosure, an artificial intelligence (AI) decoding apparatus includes a memory storing one or more instructions, and a processor configured to execute the one or more instructions stored in the memory to obtain image data generated as a result of encoding of a first image, and AI data including artifact information, obtain a second image corresponding to the first image by decoding the image data, obtain a third image by performing AI up-scaling on the second image through a deep neural network (DNN) for up-scaling, and output the artifact information and the third image to an image quality engine, wherein the image quality engine performs post-processing to change pixel values of pixels in the third image, based on the artifact information.

The artifact information may include an artifact map, and the processor may be further configured to execute the one or more instructions to up-scale the artifact map and output the up-scaled artifact map to the image quality engine.

The processor may be further configured to execute the one or more instructions to request the image quality engine to change a weight of a filter set for performing post-processing based on the artifact information, among a plurality of filter sets included in the image quality engine.

According to another embodiment of the disclosure, an artificial intelligence (AI) decoding apparatus includes a memory storing one or more instructions, and a processor configured to execute the one or more instructions stored in the memory to obtain image data generated as a result of encoding of a first image, and AI data including artifact information, obtain a second image corresponding to the first image by decoding the image data, obtain a third image by performing AI up-scaling on the second image through a deep neural network (DNN) for up-scaling, and perform post-processing to change a pixel value of a pixel in the third image, based on the artifact information.

The performing of the post-processing may include applying random noise to an artifact region in the third image.

According to another embodiment of the disclosure, an artificial intelligence (AI) encoding method includes obtaining a first image by performing AI down-scaling on an original image through a deep neural network (DNN) for down-scaling, obtaining artifact information indicating an artifact region in the first image, performing post-processing to change a pixel value of a pixel in the first image, based on the artifact information, and obtain image data corresponding to a result of encoding of the post-processed first image, and AI data including the artifact information.

According to another embodiment of the disclosure, an artificial intelligence (AI) decoding method includes obtaining image data generated as a result of encoding of a first image, and AI data including artifact information, obtaining a second image corresponding to the first image by decoding the image data, obtaining a third image by performing AI up-scaling on the second image through a deep neural network (DNN) for up-scaling, and outputting the artifact information and the third image to an image quality engine, wherein the image quality engine performs post-processing to change a pixel value of a pixel in the third image, based on the artifact information.

MODE FOR INVENTION

Throughout the disclosure, the expression "at least one of a, b or c" indicates only a, only b, only c, both a and b, both a and c, both b and c, all of a, b, and c, or variations thereof.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm.

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information.

Also, in the present specification, an 'original image' denotes an image to be an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the present specification, 'AI down-scale' denotes a process of decreasing resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image based on AI.

FIG. 1 is a diagram for describing an AI encoding process and an AI decoding process, according to an embodiment.

As described above, when resolution of an image remarkably increases, the throughput of information for encoding and decoding the image is increased, and accordingly, a method for improving efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be largely reduced compared to when the first encoding and the first decoding are performed on the original image 105.

In particular, in FIG. 1, the first image 115 is obtained by performing the AI down-scaling 110 on the original image 105 and the first encoding 120 is performed on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and AI for the AI down-scaling 110 needs to be trained jointly with AI for the AI up-scaling 140 of the second image 135. This is because, when the AI for the AI down-scaling 110 and the AI for the AI up-scaling 140 are separately trained, a difference between the original image 105 which is an object of AI encoding and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI for the AI down-scaling 110 and the AI for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, information amount of the first image 115 obtained by performing AI down-scaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via an image reconstruction method corresponding to one of image compression methods using frequency transformation, such as MPEG-2, H.264 AVC, MPEG-4, HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to quantization parameter used during the first encoding 120. The image data may be generated according to a rule, for example, according to a syntax, of an image compression method used during the first encoding 120, among MPEG-2, H.264 AVC, MPEG-4, HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be performed accurately on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

FIG. 2 is a block diagram of a configuration of an AI decoding apparatus 100 according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and distinguishably outputs image data and AI data to the AI decoder 230.

In particular, the communicator 212 receives the AI encoding data obtained as the result of AI encoding through a network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to distinguish the image data and the AI data. For example, the parser 214 may distinguish the image data and the AI data by reading a header of data obtained from the communicator 212. According to an embodiment, the parser 214 distinguishably transmits the image data and the AI data to the outputter 216 via the header of the data received through the communicator 212, and the outputter 216 transmits the distinguished image data and AI data respectively to the first decoder 232 and the AI up-scaler 234. At this time, it may be verified that the image data included in the AI encoding data is image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the verified codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual devices, but may be implemented through one processor. In this case, the receiver 210 and the AI decoder 230 may be implemented through an dedicated processor or through a combination of software and general-purpose processor such as application processor (AP), central processing unit (CPU) or graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target should correspond to down-scaling of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which are included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

FIG. 3 is a diagram showing a second DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc of the second image 135.

A convolution operation in the first convolution layer 310 will be described in detail with reference to FIG. 4.

One feature map 450 may be generated through multiplication and addition between parameters of a filter kernel 430 having a a size of 3×3 used in the first convolution layer 310 and corresponding pixel values in the second image 135. Because four filter kernels are used in the first convolution layer 310, four feature maps may be generated through the convolution operation using the four filter kernels.

I1 through I49 indicated in the second image 135 in FIG. 4 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only an example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 moves along the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The connection between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information settable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information used at this time is information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice higher than resolution of the second image 135, for example, the third image 145 of 4 K (4096×2160) twice higher than 2 K (2048×1080) of the second image 135, and another piece of DNN setting information may include information for obtaining the third image 145 of resolution four times higher than the resolution of the second image 135, for example, the third image 145 of 8 K (8192×4320) four times higher than 2 K (2048×1080) of the second image 135.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between several pieces of image-related information and several pieces of DNN setting information.

Through an embodiment according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by matching the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information, and when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information is selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are/is considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information settable in the first DNN and identifiers indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the determined structure of DNN.

The AI up-scaler 234 obtains the DNN setting information of the second DNN through the AI data including information related to the first DNN, and performs AI up-scaling on the second image 135 through the second DNN set based on the obtained DNN setting information, and in this case, memory usage and throughput may be reduced compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing the second image 135 including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is valid. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

FIG. 7 is a block diagram of a configuration of the AI encoding apparatus 600 according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate devices, but the AI encoder 610 and the transmitter 630 may be implemented through one processor. In this case, the AI encoder 610 and the transmitter 630 may be implemented through an dedicated processor or through a combination of software and general-purpose processor such as AP, CPU or graphics processing unit GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200.

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN.

According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information settable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the obtained DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution half resolution of the original image 105, for example, the first image 115 of 2 K (2048×1080) half 4 K (4096×2160) of the original image 105, and another piece of DNN setting information may include information for obtaining the first image 115 of resolution quarter resolution of the original image 105, for example, the first image 115 of 2 K (2048×1080) quarter 8 K (8192×4320) of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the obtained DNN setting information.

According to an embodiment, the AI down-scaler 612 may determine a structure of DNN corresponding to the down-scaling target, and obtain DNN setting information corresponding to the determined structure of DNN, for example, obtain parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much is resolution decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine down-scaling target for a certain number of frames, or may determine down-scaling target for entire frames.

According to an embodiment, the AI down-scaler 612 may divide the frames included in the original image 105 into a certain number of groups, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

FIG. 8 is a diagram showing the first DNN 700 for performing AI down-scaling on the original image 105.

As shown in FIG. 8, the original image 105 is input to a first convolution layer 710. The first convolution layer 710 performs a convolution process on the original image 105 by using 32 filter kernels having a size of 5×5. 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example, and the numbers of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

FIG. 9 is a diagram for describing a method of training the first DNN 700 and the second DNN 300.

In an embodiment, the original image 105 on which AI encoding is performed through an AI encoding process is reconstructed to the third image 145 via an AI decoding process, and in order to maintain similarity between the original image 105 and the third image 145 obtained as a result of AI decoding, connectivity is between the AI encoding process and the AI decoding process is required. In other words, information lost in the AI encoding process needs to be reconstructed during the AI decoding process, and in this regard, the first DNN 700 and the second DNN 300 need to be jointly trained.

For accurate AI decoding, ultimately, quality loss information 830 corresponding to a result of comparing a third training image 804 and an original training image 801 shown in FIG. 9 needs to be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, HEVC, VC-1, VP8, VP9, and AV1 may be used. In particular, any one codec among MPEG-2, H.264, MPEG-4, HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be set to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, an Structural Similarity (SSIM) value, a Peak Signal-To-Noise Ratio-Human Vision System (PSNR-HVS) value, an Multiscale SSIM(MS-SSIM) value, a Variance Inflation Factor (VIF) value, or a Video Multi-method Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first and second DNNs 700 and 300.

The first DNN 700 may update a parameter such that final loss information determined based on the first through quality loss information 810 through 830 is reduced or minimized. Also, the second DNN 300 may update a parameter such that the quality loss information 830 is reduced or minimized.

The final loss information for training the first DNN 700 and the second DNN 300 may be determined as Equation 1 below.

$$\text{Loss}DS = a \times \text{Structural loss information} + b \times \text{Complexity loss information} + c \times \text{Quality loss information}$$

$$\text{Loss}US = d \times \text{Quality loss information} \quad \text{[Equation 1]}$$

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters in a direction LossDS of Equation 1 is reduced, and the second DNN 300 updates parameters in a direction LossUS is reduced. When the parameters of the first DNN 700 are updated according to LossDS derived during the training, the first training image 802 obtained based on the updated parameters becomes different from a previous first training image 802 obtained based on not updated parameters, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. In other words, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which the parameters of the first DNN 700 are optimized may vary by adjusting the weights a, b, and c of Equation 1. For example, when the weight b is determined to be high, the parameters of the first DNN 700 may be updated by prioritizing a low bitrate over high quality of the third training image 804. Also, when the weight c is determined to be high, the parameters of the first DNN 700 may be updated by prioritizing high quality of the third training image 804 over a high bitrate or maintaining of the structural information of the original training image 801.

Also, the direction in which the parameters of the first DNN 700 are optimized may vary according to a type of codec used to perform first encoding on the first training image 802. This is because the second training image to be input to the second DNN 300 may vary according to the type of codec.

In other words, the parameters of the first DNN 700 and the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, the parameters of the first DNN 700 and the parameters of the second DNN 300 connected and optimized to each other may be determined.

Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

FIG. 10 is a diagram for describing training processes of the first DNN 700 and the second DNN by a training apparatus 1000.

The training of the first DNN 700 and the second DNN 300 described with reference FIG. 9 may be performed by the training apparatus 1000. The training apparatus 1000 includes the first DNN 700 and the second DNN 300. The training apparatus 1000 may be, for example, the AI encoding apparatus 600 or a separate server. The DNN setting information of the second DNN 300 obtained as the training result is stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to pre-determined DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 inputs the original training image 801 into the first DNN 700, in operation S850. The original training image 801 may include a still image or at least one frame included in a moving image.

The first DNN 700 processes the original training image 801 according to the initially set DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 by the training apparatus 1000. Also, the training apparatus 1000 may perform first encoding and first decoding on the first training image 802 via a certain codec, and then input the second training image to the second DNN 300.

The second DNN 300 processes the first training image 802 or the second training image according to the initially set DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initially set DNN setting information is updated in operation S880 via a back propagation process based on the final loss information. The training apparatus 1000 may calculate the final loss information for training the first DNN 700, based on the complexity loss information 820, the structural loss information 810, and the quality loss information 830.

The second DNN 300 updates the initially set DNN setting information in operation S885 via a back propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86 26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to an embodiment of the disclosure, is higher than subjective image quality when encoding and decoding are performed via HEVC, a bitrate is reduced by at least 50%.

FIG. 11 is a diagram of an apparatus 20 for performing AI down-scaling on the original image 105 and an apparatus 40 for performing AI up-scaling on the second image 135.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and sets the AI down-scaler 1124 with the obtained DNN setting information. According to an embodiment, the configuration controller 1122 may transmit the received input value 10 to the AI down-scaler 1124 and the AI down-scaler 1124 may obtain the DNN setting information for performing AI down-scaling on the original image 105, based on the received input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, HEVC, VC-1, VP8, VP9, or VA'.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and sets the AI up-scaler 1144 with the obtained DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

FIG. 12 is a block diagram of an AI encoding apparatus 900 according to another embodiment of the disclosure.

Referring to FIG. 12, the AI encoding apparatus 900 according to another embodiment of the disclosure includes an AI encoder 910 and a transmitter 930. The AI encoder 910 includes an AI down-scaler 912, an artifact remover 916, and a first encoder 914.

As described above, the AI down-scaler 912 obtains the first image 115 AI down-scaled from the original image 105 by using a first DNN. The first image 115 is an image having a resolution lower than the resolution of the original image 105. The AI down-scaling of the AI down-scaler 912 is described above, and thus a detailed description thereof will not be provided herein.

The first image 115 is provided to the artifact remover 916. The artifact remover 916 detects artifacts in the first image 115, and removes the detected artifacts. The first image 115 AI down-scaled through the first DNN may include artifacts, e.g., contour artifacts. Because the AI down-scaling reduces the resolution of the original image 105, due to the change in resolution, the first image 115 may include shapes not included in the original image 105.

FIG. 13 is an image showing artifacts having occurred in the first image 115 obtained through AI down-scaling on the original image 105.

As illustrated in FIG. 13, the first image 115 output from a first DNN may include contour artifacts 1015 having a parabolic shape.

Because the quality of a finally reconstructed image is reduced when first encoding and first decoding are performed based on the first image 115 including artifacts not included in the original image 105, the artifact remover 916 performs post-processing to remove or reduce the artifacts of the first image 115.

The artifact remover 916 generates artifact information indicating an artifact region in the first image 115. The artifact information may indicate a location of the artifact region in the first image 115.

The artifact information may include a 2-dimensional artifact map having a width and a height. A resolution of the artifact map may be the same as the resolution of the first image 115. The artifact information may include 1-dimensional data indicating the location of the artifact region in the first image 115.

Pixels in the artifact map may have a predetermined first or second pixel value, and it may be determined that the artifact exists on pixels in the first image 115 corresponding to pixels having the first pixel value in the artifact map. Also, it may be determined that the artifact does not exist on pixels in the first image 115 corresponding to pixels having the second pixel value in the artifact map.

In an embodiment of the disclosure, the artifact remover 916 may determine whether a pixel variance per block unit of the original image 105 and a pixel variance per block unit of the first image 115 satisfy a certain criterion, and generate the artifact information, based on a result of the determination. The artifact remover 916 may generate the artifact map having a predetermined pixel value per block unit, based on a result of the determination.

FIG. 14 is a diagram showing the original image 105 and the first image 115 that are divided into block units 106 and 116.

Referring to FIG. 14, the original image 105 and the first image 115 may be divided into equal numbers of block units 106 and 116. The block units 106 and 116 may have predetermined sizes, but the size of the block units 106 of the original image 105 is greater than the size of the block units 116 of the first image 115 because the resolution of the original image 105 is higher than the resolution of the first image 115.

To generate an artifact map, pixel variances of corresponding block units 106 and 116 in the original image 105 and the first image 115 may be compared.

A certain criterion for generating the artifact map may be based on a result of comparing a ratio between a pixel variance per block unit of the original image 105 and a pixel variance per block unit of the first image 115, to a certain value.

For example, the artifact remover 916 may determine that the certain criterion is satisfied, when the ratio between the pixel variance per block unit of the original image 105 and the pixel variance per block unit of the first image 115 is equal to or greater than the certain value. The certain value may be a value equal to or greater than 1 but is not limited thereto. When a value obtained by dividing the pixel variance of the original image 105 by the pixel variance of the first image 115 is equal to or greater than the certain value, it may be determined that a corresponding block unit of the first image 115 has artifacts.

As another example, the artifact remover 916 may determine that the certain criterion is satisfied, when the pixel variance per block unit of the original image 105 is greater than a first certain value and less than a second certain value, and the ratio between the pixel variance per block unit of the original image 105 and the pixel variance per block unit of the first image 115 is equal to or greater than a third certain value. The above operation may be expressed by the following pseudo code.

[Pseudo Code]
if ((org_variance (k)>first certain value) && (org_variance (k)<second certain value) && (org_variance (k)/scaled_variance (k)>=third certain value))
    artifact map (k)=first pixel value
else
    artifact map (k)=second pixel value In the pseudo code, k denotes an index of a block unit, org_variance (k) denotes a pixel variance of the block unit k of the original image 105, scaled_variance (k) denotes a pixel variance of the block unit k of the first image 115, and artifact map (k) denotes a pixel value of pixels included in the block unit k of the artifact map. The first certain value, the second certain value, and the third certain value, the first pixel value, and the second pixel value may be predetermined constants, the second certain value may be greater than the first certain value, and the third certain value may be equal to or greater than 1.

According to the pseudo code, when a value obtained by dividing a pixel variance of a block unit in the original image 105, which is greater than the first certain value and less than the second certain value, by a pixel variance of the block unit of the first image 115 is equal to or greater than the third certain value, it may be determined that the corresponding block unit of the first image 115 has artifacts.

FIG. 15 is a diagram showing an artifact map 1200 according to an embodiment of the disclosure.

FIG. 15 illustrates an example of the artifact map 1200 generated based on the above-described pseudo code, and a1, b1, etc. in FIG. 15 denote indices of block units.

Referring to FIG. 15, a block unit a1, a block unit b1, etc. may have a first pixel value, and a block unit c1, a block unit d1, etc. may have a second pixel value.

The block units having the first pixel value indicate an artifact region in the first image 115, and the block units having the second pixel value indicate a non-artifact region in the first image 115.

In an embodiment of the disclosure, the artifact remover 916 may morphology-process the artifact map 1200 generated based on a pixel variance per block unit of the original image 105 and a pixel variance per block unit of the first image 115.

The morphology-processing refers to a process of changing a pixel value of a hole in an image, based on a pixel value of neighboring pixels, or changing a pixel value of an island in an image, based on a pixel value of neighboring pixels. For example, in FIG. 15, a block unit i5 has a pixel value different from and less than the pixel value of neighboring block units h4, i4, j4, h5, j5, h6, i6, and j6 and thus may correspond to a hole, and a block unit f7 has a pixel value different from and greater than the pixel value of neighboring block units e6, f6, g6, e7, g7, e8, f8, and g8 and thus may correspond to an island.

FIG. 16 is a diagram showing an artifact map 1300 according to another embodiment of the disclosure.

FIG. 16 illustrates the artifact map 1300 which is morphology-processed, and the pixel value of the block unit i5 may be changed from the second pixel value to the first pixel value and the pixel value of the block unit f7 may be changed from the first pixel value to the second pixel value as illustrated in FIG. 16.

In an embodiment of the disclosure, the artifact remover 916 may determine an edge region in the first image 115, and change the first pixel value of a region in the artifact map corresponding to the edge region, to the second pixel value. The edge region of the first image 115 is regarded as having no artifacts, and thus the pixel value of the region of the artifact map corresponding to the edge region is determined as the second pixel value.

FIG. 17 is a diagram showing an artifact map 1400 according to another embodiment of the disclosure.

For example, as illustrated in the artifact map 1400 of FIG. 17, the artifact remover 916 may change pixel values of regions 1410 corresponding to the edge region of the first image 115 in the artifact map 1300 illustrated in FIG. 16, from the first pixel value to the second pixel value. According to another embodiment of the disclosure, the artifact remover 916 may change pixel values of regions corresponding to the edge region of the first image 115 in the artifact map 1200 illustrated in FIG. 15, from the first pixel value to the second pixel value.

The artifact remover 916 may perform post-processing to change pixel values of pixels in the first image 115, based on the artifact map 1200, 1300, or 1400 illustrated in FIG. 15, 16, or 17.

Meanwhile, when the first image 115 includes a plurality of frames, the artifact remover 916 may generate an artifact map corresponding to each of the plurality of frames. In an embodiment of the disclosure, to prevent an increase in bitrate, the artifact remover 916 may generate artifact maps corresponding to only some of the plurality of frames of the first image 115. For example, the artifact remover 916 may generate artifact maps corresponding to only I frames and/or frames in which scene changes occur among the plurality of frames.

The artifact remover 916 may apply random noise to an artifact region in the first image 115, based on the artifact map. Specifically, the artifact remover 916 may add a random noise value to a pixel value of a region in the first image 115 corresponding to a region having the first pixel value in the artifact map. The random noise may have a value randomly selected within a certain range. The certain range may be, for example, {−1, 0, 1}, but is not limited thereto. The random noise value to be applied to the first image 115 may be determined per pixel of the first image 115.

The artifact remover 916 may determine the range of the random noise value applied to the first image 115, and apply a random value included in the range of the random noise value, to the artifact region in the first image 115. The range of the random noise value refers to an artifact removal intensity, and a large range of the random noise value may mean that the artifact removal intensity is high. For example, the range of the random noise value corresponding to a first intensity may be {−1, 0, 1}, and the range of the random noise value corresponding to a second intensity higher than the first intensity may be {−2, −1, 0, 1, 2}.

The artifact remover 916 may determine the range of the random noise value, based on a predetermined criterion. For example, the artifact remover 916 may determine the range of the random noise value, based on at least one of the type of the original image 105 (e.g., a file type), a resolution of the original image 105, or the kinds of a subject included in the original image 105.

As another example, the artifact remover 916 may determine the range of the random noise value in consideration of the certain value considered to generate the artifact map (e.g., at least one of the first certain value, the second certain value, or the third certain value). For example, when it is determined whether the ratio between the pixel variance per block unit of the original image 105 and the pixel variance per block unit of the first image 115 is equal to or greater than the certain value (or the third certain value), the range of the random noise value may be determined in proportion to the certain value (or the third certain value). A large ratio between the pixel variance per block unit of the original image 105 and the pixel variance per block unit of the first image 115 may mean serious artifacts in the first image 115 and, in this case, a large range of the random noise value may be determined.

The artifact remover 916 may filter the first image 115 to which the random noise is applied. Herein, the filtering may include a process of smoothing the first image 115 to which the random noise is applied. For example, the filtering may include Gaussian filtering, but is not limited thereto.

In an embodiment of the disclosure, the artifact remover 916 may use an artifact detection network to generate the artifact map. The artifact detection network is a sort of a DNN, and may include at least one convolution layer. The artifact detection network may be trained based on an input image and a ground truth (GT) image including identified artifacts. The artifact remover 916 may input the first image 115 to the artifact detection network, and obtain the artifact map output from the artifact detection network.

The first encoder 914 performs first encoding on the first image post-processed by the artifact remover 916. The first encoding may include, for example, generating prediction data by predicting the post-processed first image, generating residual data corresponding to a difference between the post-processed first image and the prediction data, transforming the residual data corresponding to a spatial domain component, into a frequency domain component, quantizing the residual data transformed into the frequency domain component, and entropy-encoding the quantized residual data, and so on.

A data processor 932 processes at least one of AI data or image data to be transmittable in a certain form. For example, when the AI data and the image data need to be transmitted in the form of a bitstream, the data processor 932 processes the AI data to be expressed in the form of a bitstream and transmits the AI data and the image data in the form of a single bitstream through a communicator 934. As another example, the data processor 932 processes the AI data to be expressed in the form of a bitstream and transmits, through the communicator 934, a bitstream corresponding to the AI data and a bitstream corresponding to the image data. As another example, the data processor 932 processes the AI data to be expressed in a frame or packet form and transmits, through the communicator 934, a bitstream corresponding to the image data and a frame or packet corresponding to the AI data.

The communicator 934 transmits, through a network, AI encoding data generated as a result of performing AI encoding. The AI encoding data generated as a result of performing AI encoding includes image data and AI data.

The image data and the AI data may be transmitted through the same network or a different network.

The image data includes data generated as a result of first encoding on the post-processed first image. The image data may include data generated based on pixel values in the post-processed first image, e.g., the residual data corresponding to the difference between the post-processed first image and the prediction data. The image data may include information used in the first encoding process of the post-processed first image. For example, the image data may include mode information and quantization-parameter-related information used in the first encoding process of the post-processed first image.

The AI data includes information for allowing an AI decoding apparatus to perform AI up-scaling on the second image 135 according to an up-scale target corresponding to a down-scale target of a first DNN. In an example, the AI data may include difference information between the original image 105 and the first image 115 (or the post-processed first image). The AI data may include information related to the first image 115 (or the post-processed first image). The information related to the first image 115 (or the post-processed first image) may include information about at least one of a resolution of the first image 115 (or the post-processed first image), a bitrate of the image data generated as a result of first encoding on the post-processed first image, or a codec type used to the first encoding on the post-processed first image.

The AI data includes the artifact information generated by the artifact remover 916. For example, the AI data may include data of the artifact map.

In an embodiment of the disclosure, the first encoder 914 performs first encoding on the artifact map, and the artifact map is transmitted as the image data.

FIG. 18 is a flowchart of an AI encoding method according to an embodiment of the disclosure.

In operation S1510, the AI encoding apparatus 900 obtains the first image 115 by performing AI down-scaling on the original image 105 by using a first DNN.

In operation S1520, the AI encoding apparatus 900 obtains artifact information indicating an artifact region in the first image 115. The artifact information may include an artifact map having a certain size.

The AI encoding apparatus 900 may obtain the artifact information, based on a pixel variance per block unit of the original image 105 and a pixel variance per block unit of the first image 115. As another example, the AI encoding apparatus 900 may obtain the artifact information by using an artifact detection network.

In an embodiment of the disclosure, morphology-processing and/or pixel value changing based on an edge region in the first image 115 may be performed on the artifact information, and more particularly, on the artifact map.

In operation S1530, the AI encoding apparatus 900 performs post-processing to change pixel values of pixels in the first image 115, based on the artifact information. For example, the AI encoding apparatus 900 may apply random noise to a partial region of the first image 115.

As the post-processing, the AI encoding apparatus 900 may filter the first image 115 to which the random noise is applied. Herein, the filtering may include Gaussian filtering, but is not limited thereto. For example, the filtering may include various types of filtering methods for smoothing the first image 115. Because the random noise is applied to only the partial region in the first image 115, the smoothing is performed to reduce the difference between the region to which the random noise is applied, and the other region.

In operation S1540, the AI encoding apparatus 900 performs first encoding on the post-processed first image. The AI encoding apparatus 900 transmits, to an AI decoding apparatus, AI data and image data generated as a result of first encoding on the post-processed first image. The AI data includes the artifact information.

FIG. 19 is a block diagram of an AI decoding apparatus 1600 according to another embodiment of the disclosure.

Referring to FIG. 19, the AI decoding apparatus 1600 includes a receiver 1610 and an AI decoder 1630. The receiver 1610 includes a communicator 1612, a parser 1614, and an outputter 1616, and the AI decoder 1630 includes a first decoder 1632 and an AI up-scaler 1634.

The communicator 1612 receives, through a network, AI encoding data including image data and AI data. The image data includes information generated as a result of first encoding on the post-processed first image, and the AI data includes artifact information.

The parser 1614 divides the AI encoding data received through the communicator 1612, into the image data and the AI data, and transmits the image data through the outputter 1616 to the first decoder 1632 and transmits the AI data through the outputter 1616 to the AI up-scaler 1634.

Operations of the communicator 212, the parser 214, and the outputter 216 of the AI decoding apparatus 200 described above in relation to FIG. 2 are the same as those of the communicator 1612, the parser 1614, and the outputter 1616 of the AI decoding apparatus 1600 of FIG. 19, and thus detailed descriptions thereof will not be provided herein.

The first decoder 1632 generates the second image 135 corresponding to the post-processed first image, by performing first decoding on the image data. In an embodiment of the disclosure, when the artifact information is processed through the first encoding and transmitted to the communicator 1612, the first decoder 1632 may generate artifact information by performing first decoding on the image data corresponding to the artifact information.

The AI up-scaler 1634 receives the second image 135 from the first decoder 1632, and performs AI up-scaling on the second image 135 to obtain the third image 145, based on a second DNN. The AI up-scaling based on the second DNN is described above in relation to FIG. 2, etc., and thus a description thereof will not be provided herein.

The AI up-scaler 1634 outputs the third image 145 and the artifact information. In an embodiment of the disclosure, the AI up-scaler 1634 may up-scale and then output an artifact map. Because the artifact map may have a resolution the same as the resolution of the first image 115 as described above, the AI up-scaler 1634 may up-scale the artifact map to have a resolution the same as that of the third image 145. In this case, the AI up-scaler 1634 may legacy-upscale the artifact map.

In an embodiment of the disclosure, the AI up-scaler 1634 outputs the artifact information and the third image 145 to an image quality engine. The image quality engine improves the quality of an image before the image is displayed on a display apparatus such as a television (TV). The image quality engine may include a plurality of filters for processing the image. For example, the image quality engine may improve the quality of the image by performing at least one of image signal analysis, noise removal, detail enhancement, or up-scaling on the image.

In an embodiment of the disclosure, when the AI decoding apparatus 1600 is included in the display apparatus, to allow the image quality engine to improve the quality of the third image 145, the AI up-scaler 1634 may output the artifact information and the third image 145 to a memory (e.g., a main memory or an auxiliary memory) in the display apparatus and the memory may store the artifact information and the third image 145. The image quality engine may load the third image 145 and the artifact information from the memory and improve the quality of the third image 145. Alternatively, to allow the image quality engine to improve the quality of the third image 145, the AI up-scaler 1634 may directly transmit the artifact information and the third image 145 to the image quality engine in the display apparatus.

In an embodiment of the disclosure, the AI decoding apparatus 1600 may output or transmit the third image 145 and the artifact information to the display apparatus through a wired and/or wireless network.

The image quality engine performs post-processing to change pixel values of pixels in the third image 145, based on the artifact information. The image quality engine may apply random noise to an artifact region in the third image 145. The image quality engine may process the third image 145 to which the random noise is applied by using a filter, e.g., a smoothing filter.

FIG. 20 is a block diagram of an image quality engine 1700.

The image quality engine 1700 may include a plurality of filters, and artifact information may be input to a filter e.g., a de-contour filter of FIG. 20, for post-processing the third image 145 based on the artifact information.

In an embodiment of the disclosure, the image quality engine 1700 may effectively remove artifacts in the third image 145 by changing a weight of the de-contour filter. For example, the image quality engine 1700 may increase or reduce a predetermined weight of the de-contour filter. In an embodiment of the disclosure, the image quality engine 1700 may change the weight of the de-contour filter, based on a request from the AI up-scaler 1634.

The third image 145 having passed through the plurality of filters of the image quality engine 1700 may be finally displayed on a display apparatus.

FIG. 21 is a block diagram of an AI decoding apparatus 1800 according to another embodiment of the disclosure.

Referring to FIG. 21, the AI decoding apparatus 1800 includes a receiver 1810 and an AI decoder 1830. The receiver 1810 includes a communicator 1812, a parser 1814, and an outputter 1816, and the AI decoder 1830 includes a first decoder 1832, an AI up-scaler 1834, and an artifact remover 1836.

The communicator 1812 receives, through a network, AI encoding data including image data and AI data. The image data includes information generated as a result of first encoding the post-processed first image, and the AI data includes artifact information.

The parser 1814 divides the AI encoding data received through the communicator 1812, into the image data and the AI data, and transmits the image data through the outputter 1816 to the first decoder 1832 and transmits the AI data through the outputter 1816 to the AI up-scaler 1834.

Operations of the communicator 212, the parser 214, and the outputter 216 of the AI decoding apparatus 200 described above in relation to FIG. 2 are the same as those of the communicator 1812, the parser 1814, and the outputter 1816 of the AI decoding apparatus 1800 of FIG. 21, and thus detailed descriptions thereof will not be provided herein.

The first decoder 1832 obtains the second image 135 corresponding to the post-processed first image, by performing first decoding on the image data. In an embodiment of the disclosure, when the artifact information is processed based on the first encoding and transmitted to the communicator 1812, the first decoder 1832 may obtain artifact information by performing first decoding on the image data corresponding to the artifact information. In this case, the artifact information may be provided from the first decoder 1832 to the artifact remover 1836.

The artifact remover 1836 may receive, from the outputter 1816, the artifact information included in the AI data. Otherwise, the artifact remover 1836 may receive, from the first decoder 1832, the artifact information reconstructed as a result of first decoding on the image data. Alternatively, the artifact remover 1836 may receive, from the AI up-scaler 1834, the artifact information included in the AI data.

The artifact remover 1836 may receive the second image 135 obtained by the first decoder 1832, and perform post-processing to change pixel values of pixels in the second image 135, based on the artifact information. The artifact remover 1836 may apply random noise to an artifact region in the second image 135.

When the AI data includes information about a range of a random noise value, the artifact remover 1836 may check the range of the random noise value and apply, to the second image 135, random noise having a value included in the checked range of the random noise value.

The artifact remover 1836 may filter the second image 135 to which the random noise is applied. Herein, the filtering may include a process of smoothing the second image 135 to which the random noise is applied. For example, the filtering may include Gaussian filtering, but is not limited thereto.

The post-processed second image output from the artifact remover 1836 is transmitted to the AI up-scaler 1834, and the AI up-scaler 1834 outputs the third image 145 obtained according to the AI up-scaling on the post-processed second image through a second DNN. The output third image 145 may be post-processed and then displayed by a display apparatus when necessary.

In an embodiment of the disclosure, the artifact remover 1836 may post-process the third image 145 instead of the second image 135. In this case, the AI up-scaler 1834 may provide, to the artifact remover 1836, the third image 145 by performing AI up-scaling on the second image 135 that is obtained by the first decoder 1832. To post-process the third image 145, the AI up-scaler 1834 may generate a high-resolution artifact map by up-scaling a low-resolution artifact map, and provide the high-resolution artifact map to the artifact remover 1836.

The artifact remover 1836 performs post-processing to change pixel values of pixels in the third image 145, based on the artifact information. The artifact remover 1836 may apply random noise to an artifact region in the third image 145, based on the artifact information. The artifact remover 1836 may filter the third image 145 to which the random noise is applied. Herein, the filtering may include a process of smoothing the third image 145 to which the random noise is applied.

The post-processed third image may be output from the artifact remover 1836 and be displayed.

FIG. 22 is a flowchart of an AI decoding method according to another embodiment of the disclosure.

In operation S1910, the AI decoding apparatus 1600 obtains image data obtained as a result of first encoding on the post-processed first image, and AI data related to AI down-scaling.

The image data may be received in the form of a bitstream. The image data may include data generated based on pixel values in the post-processed first image, e.g., residual data corresponding to a difference between the post-processed first image and prediction data. The image data include information used in first encoding process on the post-processed first image. For example, the image data may include mode information and quantization-parameter-related information used in the first encoding process on the post-processed first image.

The AI data includes information for allowing a second DNN to perform AI up-scaling on the second image 135 according to an up-scale target corresponding to a down-scale target of a first DNN. The AI data includes artifact information indicating an artifact region in the first image 115.

In operation S1920, the AI decoding apparatus 1600 obtains the second image 135, based on the image data. Specifically, the AI decoding apparatus 1600 obtains the second image 135 corresponding to the post-processed first image, by performing first decoding on the image data, based on an image reconstruction method using frequency transformation.

In operation S1930, the AI decoding apparatus 1600 obtains the third image 145 by performing AI up-scaling on the second image 135 by using the second DNN.

In operation S1940, the AI decoding apparatus 1600 outputs the artifact information and the third image 145 to an image quality engine. The AI decoding apparatus 1600 may request to change a weight of a filter for processing the third image 145 by using the artifact information, among a plurality of filters of the image quality engine.

The third image 145, the quality of which is improved by the image quality engine may be displayed by a display apparatus.

In another embodiment of the disclosure, the AI decoding apparatus 1600 may post-process the second image 135 or the third image 145, based on the artifact information or the up-scaled artifact information, and output the post-processed second image or the post-processed third image to the display apparatus, e.g., the image quality engine. The post-processing may include random noise application and filtering.

Training of the first DNN 700 and the second DNN 300 is described above in relation to FIG. 9 and, in an embodiment of the disclosure, the first DNN 700 and the second DNN 300 may be trained by replacing the first training image 802 of FIG. 9 with the first training image post-processed based on the artifact information. As an input of the second DNN 300, the second training image obtained by performing first encoding and first decoding on the post-processed first training image may be used. The first DNN 700 and the second DNN 300 may be trained by replacing the third training image 804 with the third training image post-processed based on the artifact information.

The afore-described embodiments of the disclosure may be written as computer-executable programs or instructions, and the written programs or instructions may be stored in a medium.

The medium may permanently store the computer-executable programs or instructions, or temporarily store the programs or instructions for execution or downloading. The medium may include various recording or storage means in the form of a single hardware element or a combination of multiple hardware elements, and is not limited to a medium directly connected to a certain computer system and may be distributed over a network. Examples of the medium include magnetic media (e.g., hard disks, floppy disks, and magnetic tapes), optical media (e.g., CD-ROMs or DVDs), magneto-optical media (e.g., floptical disks), and ROMs, RAMs, flash memories, etc. configured to store program instructions. Other examples of the medium include recording or storage media managed by application stores for distributing applications and various web-sites or servers for supplying or distributing software.

The above-described model related to a DNN may be implemented as a software module. When implemented as a software module (e.g., a program module including instructions), the DNN model may be stored in a computer-readable recording medium.

The DNN model may be integrated in the form of a hardware chip and serve as a part of the above-described AI decoding apparatus 200, 1600, or 1800 or the above-described AI encoding apparatus 600 or 900. For example, the DNN model may be produced in the form of a hardware chip dedicated to artificial intelligence, or be produced as a part of a general-purpose processor (e.g., a central processing unit (CPU) or an application processor) or a dedicated graphic processor (e.g., a graphic processing unit (GPU)).

The DNN model may also be provided in the form of downloadable software. A computer program product may include a product in the form of a software program that is electronically distributed by a manufacturer or an electronic market (e.g., a downloadable application). For electronic distribution, at least a part of the software program may be stored in a storage medium or be temporarily created. In this case, the storage medium may be a server of the manufacturer or the electronic market, or a storage medium of a relay server.

An AI encoding and AI decoding method and apparatus according to an embodiment of the disclosure may AI-encode and AI-decode the image at a low bitrate by using a deep neural network.

The AI encoding and AI decoding method and apparatus according to an embodiment of the disclosure may improve the quality of the image by removing artifacts in the image.

However, the AI encoding and AI decoding method and apparatus according to an embodiment of the disclosure are not limited to the above-described effects and other effects thereof will be apparently understood from the following description by one of ordinary skill in the art.

While one or more embodiments of the disclosure have been described with reference to the figures, it will be understood by one of ordinary skill in the art that various changes in form and details may be made therein without departing from the scope as defined by the following claims.

The invention claimed is:

1. An electronic device for displaying an image by using an artificial intelligence (AI), the electronic device comprising:
 a display; and
 one or more processors configured to execute one or more instructions stored in the electronic device to:
  receive image data corresponding to an encoding result on a first image;
  receive AI data related to AI down-scaling an original image to the first image, the AI data comprising artifact information and a bitrate of the image data being used to select first neural network (NN) setting information, the artifact information comprising a location of an artifact region in the first image;
  obtain a second image by decoding the image data;
  based on the AI data, select the first NN setting information from a plurality of first NN setting information that is pre-stored in the electronic device;
  obtain a third image by performing AI up-scaling on the second image through an up-scaling NN that is set with the selected first NN setting information;
  change pixel values of pixels in the third image, based on the artifact information; and
  provide the third image of which the pixel values are changed, to the display,
 wherein the first image is obtained through a down-scaling NN configured with selected second NN setting information from among a plurality of second NN setting information for the AI down-scaling, and
 wherein the plurality of first NN setting information and the plurality of second NN setting information are obtained through joint training of the down-scaling NN and the up-scaling NN.

2. The electronic device of claim 1, wherein the artifact information comprises an artifact map, and
wherein the one or more processors are further configured to execute the one or more instructions to up-scale the artifact map.

3. The electronic device of claim 1, wherein the one or more processors are further configured to execute the one or more instructions to change a weight of a filter set for changing the pixel values based on the artifact information, among a plurality of filter sets.

4. The electronic device of claim 1, wherein the one or more processors further comprise:
a first processor configured to receive the image data and decode the image data to obtain the second image,
a second processor configured to receive the AI data and the second image from the first processor, and output the third image and the artifact information, and
a third processor configured to change the pixel values of pixels in the third image, based on the artifact information.

5. A method of displaying an image by an electronic device configured to use an artificial intelligence (AI), the method comprising:
receiving image data corresponding to an encoding result on a first image;
receiving AI data related to AI down-scaling an original image to the first image, the AI data comprising artifact information and a bitrate of the image data being used to select first neural network (NN) setting information, the artifact information comprising a location of an artifact region in the first image;
obtaining a second image by decoding the image data;
based on the AI data, selecting the first NN setting information from a plurality of first NN setting information that is pre-stored in the electronic device;
obtaining a third image by performing AI up-scaling on the second image, through an up-scaling NN that is set with the selected first NN setting information;
changing pixel values of pixels in the third image, based on the artifact information; and
providing, on a display, the third image of which the pixel values are changed,
wherein the first image is obtained through a down-scaling NN configured with selected second NN setting information from among a plurality of second NN setting information for the AI down-scaling, and
wherein the plurality of first NN setting information and the plurality of second NN setting information are obtained through joint training of the down-scaling NN and the up-scaling NN.

6. A non-transitory computer-readable recording medium having recorded thereon a program which, when executed by the electronic device, performs the method of claim 5.

* * * * *